United States Patent
Wilson

(10) Patent No.: US 6,700,718 B2
(45) Date of Patent: Mar. 2, 2004

(54) VSWR SKIP WRITE DETECTOR

(75) Inventor: David Robert Wilson, Platteville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 186 days.

(21) Appl. No.: 09/874,705

(22) Filed: Jun. 5, 2001

(65) Prior Publication Data

US 2002/0036848 A1 Mar. 28, 2002

Related U.S. Application Data

(60) Provisional application No. 60/236,309, filed on Sep. 28, 2000.

(51) Int. Cl.$^7$ ............................................... G11B 27/36
(52) U.S. Cl. .............................. 360/31; 360/75; 360/60; 360/53
(58) Field of Search ................................ 324/210, 212, 324/226; 369/53.42, 53.2, 53.11, 53.12, 53.13; 360/25, 31, 53, 60, 48, 75, 46

(56) References Cited

U.S. PATENT DOCUMENTS 5,909,334 A    6/1999  Barr et al.
6,141,312 A   10/2000  Masters et al.

OTHER PUBLICATIONS

Mar. 2, 1999, Maxtor Whitepaper "Maxsafe".
Jun. 25, 1999, Western Digital Web Page "Fly Height Monitor Improves Hand Drive Reliability".

*Primary Examiner*—Alan T. Faber
(74) *Attorney, Agent, or Firm*—Merchant & Gould P.C.

(57) ABSTRACT

An apparatus and associated method is disclosed to detect a skip write error occurring during a data storage device write process using a voltage standing wave ratio ("VSWR"), determined by monitoring the voltage reflected by the write element. A change in the read/write head fly height is monitored by comparing the instantaneous voltage standing wave ratio to a baseline voltage standing wave ratio. If the read/write head fly height is determined to be outside of a predetermined range, a skip write error is assumed resulting in a suspension of the write operation and the institution of a rewrite procedure.

18 Claims, 9 Drawing Sheets

VSWR SKIP WRITE DETECTOR

RELATED APPLICATIONS

This application claims priority of U.S. provisional application Ser. No. 60/236,309, filed Sep. 28, 2000.

FIELD OF THE INVENTION

This application relates generally to the field of information storage and more particularly to a method and apparatus for verifying that data written on a storage disc can be reliably recovered during subsequent read operations.

BACKGROUND OF THE INVENTION

The need for larger capacity data storage devices has become critical with the staggering pace of advances in computer technology. The most common data storage device used within computers today is the disc drive. The amount of data that can be stored on a disc drive has increased dramatically in recent years. Coupled with the need for larger storage capacity is a desire to increase the information throughput of the drive (i.e., increase the rate at which information is stored to and retrieved from the disc drive).

Most disc drives are composed of one or more magnetic media discs attached to a spindle. A spindle motor rotates the spindle and discs at a constant high speed. An actuator assembly adjacent to the disc(s) has actuator arms extending over the discs, each with one or more flexures extending from each actuator arm. A read/write head is mounted at the distal end of each of the flexures. The read/write head includes an air bearing slider enabling the head to "fly" in close proximity above the corresponding surface of the associated disc. The distance between the read/write head and the surface of the associated disc during disc drive operation is called the "fly height." Information is stored on and retrieved from a disc via the read/write head.

Information is stored on the disc surface as a bit. A bit is represented by a "1" or "0," which corresponds to a change or lack of change, respectively, in the orientation of adjacent magnetic domains on the disc surface. A domain's magnetic orientation is changed using the disc drive's write element. A write element is essentially an inductive coil. A magnetic field is generated around the write element by passing a current through the coil. The magnetic flux of the generated field, if strong enough, orients the magnetization direction of a magnetic domain located on the disc surface. The direction of the current in the write element dictates the direction of the magnetic flux of the generated field, and subsequently, the orientation direction of the magnetic domain.

As mentioned above, the strength of the magnetic field present at the disc surface must be strong enough to orient the magnetic domain. The strength of the magnetic field relative to the disc surface decreases as fly height increases. The magnetic field relative to the disc surface may not be strong enough to change the magnetic domain's orientation if the fly height becomes too great. One solution is to increase the strength of the magnetic field. The strength of the magnetic field, however, must be limited to prevent changing the orientation of adjacent domains located on the disc surface. The fly height of the read/write head, therefore, is critical to insure that the limited magnetic field is sufficient to change the orientation of the desired magnetic domain.

Information stored on the disc surface is retrieved using the read element. The read element senses the orientation changes of the magnetic domains on the disc surface. The changes in the magnetic domain orientations create an electrical signal in the read element. The read element must be very sensitive to detect the orientation changes of the small magnetic domains. The disc drive's preamplifier is used to amplify the resulting signal before the signal is sent to the disc drive controller. Again, the fly height of the read/write head is critical to insure that the read element is close enough to the disc surface to detect the orientation changes in the magnetic domains such that an electrical signal is produced within the read element.

Each disc is radially divided into a finite number of concentric tracks to facilitate organization of the stored bits. Each track is a certain width and is separated from the adjacent tracks by a "blank space." This blank space prevents information stored in one track from overlapping the information stored in an adjacent track. The number of tracks located on each disc surface is known as the "track density." Each track is linearly subdivided into sections, called segments. Bits are written to and read from these segments by the read/write head. The linear density of bits stored within each segment is called the "bit density."

The product of track density and bit density is known as "areal density." The recent trend being followed by disc drive manufacturers is to increase the recording media's areal density so that the amount of data stored can be increased without increasing the physical size or the number of discs used in a drive. For example, the areal density of early disc drives was less than 1 gigabits per square inch (Gbits/sq. inch), whereas today, disc drives with areal densities greater than 40 Gbits/sq. inch are being tested. Manufacturers increase areal density by increasing both track density and bit density. Track density is increased by narrowing the track width and/or narrowing the width of the blank spaces between tracks. Bit density is usually increased by increasing the recording speed in order to record higher frequency bits. A higher frequency bit is smaller, and therefore, takes up less space on the disc surface.

An increase in areal density has a direct effect on the fly height of the read/write head. The write element must fly closer to the disc surface when writing information at a higher areal density because the "blank space" and track width become smaller. A decrease in fly height is necessary to insure that the magnetic field present at the disc surface is strong enough to change the desired domain's orientation without overwriting information stored in an adjacent track. Likewise, the read element must fly closer to the disc surface when retrieving information from a disc with higher areal density in order for the smaller bits to adequately generate a signal within the read element. The fly height, in summary, must become smaller in order for the read and write operations to be completed effectively as areal density increases.

The fly height in current disc drives has decreased to less than 1 microinch ($\mu$-in). A small contaminate particle, vibration, external shock, or a disc surface defect, among others, can affect disc drive performance at such low flying heights. For example, a dust particle that hits the read/write head can cause the read/write head to "bounce" away from the surface of the disc. If this bounce occurs while information is being written to the disc, the magnetic field generated by the write element may not be strong enough, relative to the disc surface, to change the desired domain's orientation and accurately record the information on the disc. This problem is known in the art as a "skip write" or "skip write error."

Most disc drives are manufactured in a clean room environment in order to prevent the presence of contaminate particles in an assembled disc drive. Most clean rooms are Class 100 clean rooms. Class 100 means that 100 contaminate particles per-liter-of-air are present in the room. Class 100 clean rooms were adequate for older disc drives, but current disc drives with lower fly heights require Class 10 clean rooms. Class 10 means that only 10 contaminate particles per-liter-of-air are present in the room. The amount of filtering needed to reach and maintain Class 10 status dramatically increases the cost of the disc drive manufacturing process.

Disc drive manufacturers place filters within the disc drive to trap the contaminate particles introduced during the manufacturing process. The filters also trap contaminate particles emitted from the drive's components during normal operation. The filters require between 100 and 200 hours of normal drive operation to effectively capture the contaminate particles. A brand new drive, however, is usually used by industry testing facilities during benchmark testing (i.e., performance testing); before the internal filters have had an opportunity to trap the contaminate particles. The likelihood that a contaminate particle will cause a skip write during benchmark testing is high. The detection and correction of a skip write error during benchmark testing adversely affects the disc drive's performance rating. Any degradation of performance during benchmark testing can lead to a decrease in consumer demand for the particular disc drive being tested. Additionally, detection and correction of a skip write error during normal disc drive operation adversely affects the user's computing efficiency.

Disc drive manufacturers address skip write problems by using read verification and/or fly height monitoring. Read verification consists of reading the information that was stored during the write operation and comparing the information actually stored to the information intended to be stored. If the information actually stored differs from the information intended to be stored beyond an acceptable level, a likely skip write error is detected. A subsequent write operation is completed when a skip write error is detected and another read verify operation is completed to insure that the subsequent write operation was successful. This process continues until a successful write operation is completed at that disc location, or the information may be stored at a different disc location after a predetermined number of write attempts have failed. The additional read, compare, and write steps of the read verify operation, however, take a large amount of time and adversely affect the performance rating of the disc drive.

A second method of determining whether a skip write error has occurred is fly height monitoring. The fly height of the write element can be constantly monitored during normal write operations by determining the ratio of the magnetic pulse area to the magnetic pulse peak. An increase in the flying height of the read/write head corresponds to an increase in the magnetic pulse area, and therefore, an increase in the measured ratio. The writing process can be suspended and recovery procedures can be instituted if the ratio between the magnetic pulse area and magnetic pulse peak indicates that an acceptable fly height has been exceeded. However, this requires complicated computations to determine the magnetic pulse area, the magnetic pulse peak, and the ratio between the area and peak.

Accordingly, there is a need for a solution for detecting whether a successful write operation has been completed and for correcting for an unsuccessful write operation that does not require a read verification procedure or complicated fly height computations.

SUMMARY OF THE INVENTION

Against this backdrop, embodiments of the present invention have been developed to determine whether a successful write operation has been completed. Embodiments of the present invention offer an apparatus and associated method to monitor the fly height of the read/write head during a write operation. The fly height can be used as an indication of whether the write operation was completed successfully. Embodiments of the present invention can be used for various types of storage systems such as magnetic and optical disc drives among others, however, a magnetic disc drive has been used to illustrate an embodiment of the present invention.

Accordingly, a preferred embodiment of the present invention relates to an apparatus and associated method of detecting whether a skip write error has likely occurred in a data storage device by monitoring the voltage standing wave ratio ("VSWR") of a signal reflected by the write element during a write operation. The VSWR is a measure of the amount of signal reflected by the write element due to an impedance imbalance between the write element and the write current source and write element electrical leads. The method includes comparing an instantaneous VSWR value to a baseline VSWR value. If the instantaneous VSWR value varies from the baseline VSWR value for a specified time and amount, a skip write error is likely detected. Additionally, embodiments of the present invention include suspending the write operation and initiating a rewrite process if a skip write error is detected.

A preferred embodiment further relates to an apparatus and associated method that includes amplifying, filtering, and rectifying the reflected signal in a circuit. Furthermore, simultaneously transmitting the rectified signal to a sample-and-hold circuit and to another filter circuit. The signal sent to the filter circuit is compared to the signal held constant by the sample-and-hold circuit. Furthermore, suspending the write process and implementing a rewrite procedure if the filtered, rectified signal varies too greatly from the signal that was held constant by the sample-and-hold circuit.

More particularly, a preferred embodiment of the present invention relates to an apparatus for determining the fly height of a read/write head and for detecting whether a skip write error is occurring. The apparatus includes a circuit inductively coupled to the closed-loop electrical circuit created by the write element and the write element electrical leads. The circuit determines the instantaneous voltage standing wave ratio ("VSWR") of a signal reflected by the write element during a write operation and compares the instantaneous VSWR to a baseline VSWR value. The VSWR of the signal reflected by the write element is directly related to the fly height of the write element. In other words, a change in fly height causes a corresponding change in the amplitude of the reflected signal. The apparatus of the preferred embodiment notifies the controller to suspend the write process and institute a rewrite process if the magnitude of the instantaneous VSWR deviates from the baseline VSWR value by more than a set amount. The baseline VSWR value corresponds to the fly height of the write element during nominal disc operation (i.e., during operation when a skip write event is not occurring). The circuit includes an amplifier, rectifier, filter, sample and hold circuit, and comparator among other components.

Embodiments of the present invention do not require a read verification step to be completed, nor complicated computations to determine whether a skip write error has likely occurred. This increases the disc throughput; in other words, the speed that data can be stored and retrieved from the disc. Furthermore, this immediately achieves the increase in throughput, eliminating the 100 to 200 hours of operation usually needed by the disc's internal filters to trap contaminate particles. Therefore, the need for more stringent clean room filtering can be reduced because acceptable performance can be achieved even though higher contaminate levels might be present in the disc drive.

These and various other features as well as additional advantages which characterize embodiments of the present invention will be apparent from a reading of the following detailed description and a review of the associated drawings.

DETAILED DESCRIPTION

The present invention offers an apparatus and associated method to monitor the fly height of the read/write head during a write operation. The fly height can be used as an indication of whether the write operation was completed successfully. A magnetic disc drive has been used to illustrate a preferred embodiment of the present invention, however, embodiments of the present invention can be used for various types of storage systems such as magnetic and optical disc drives among others.

Figure 1:
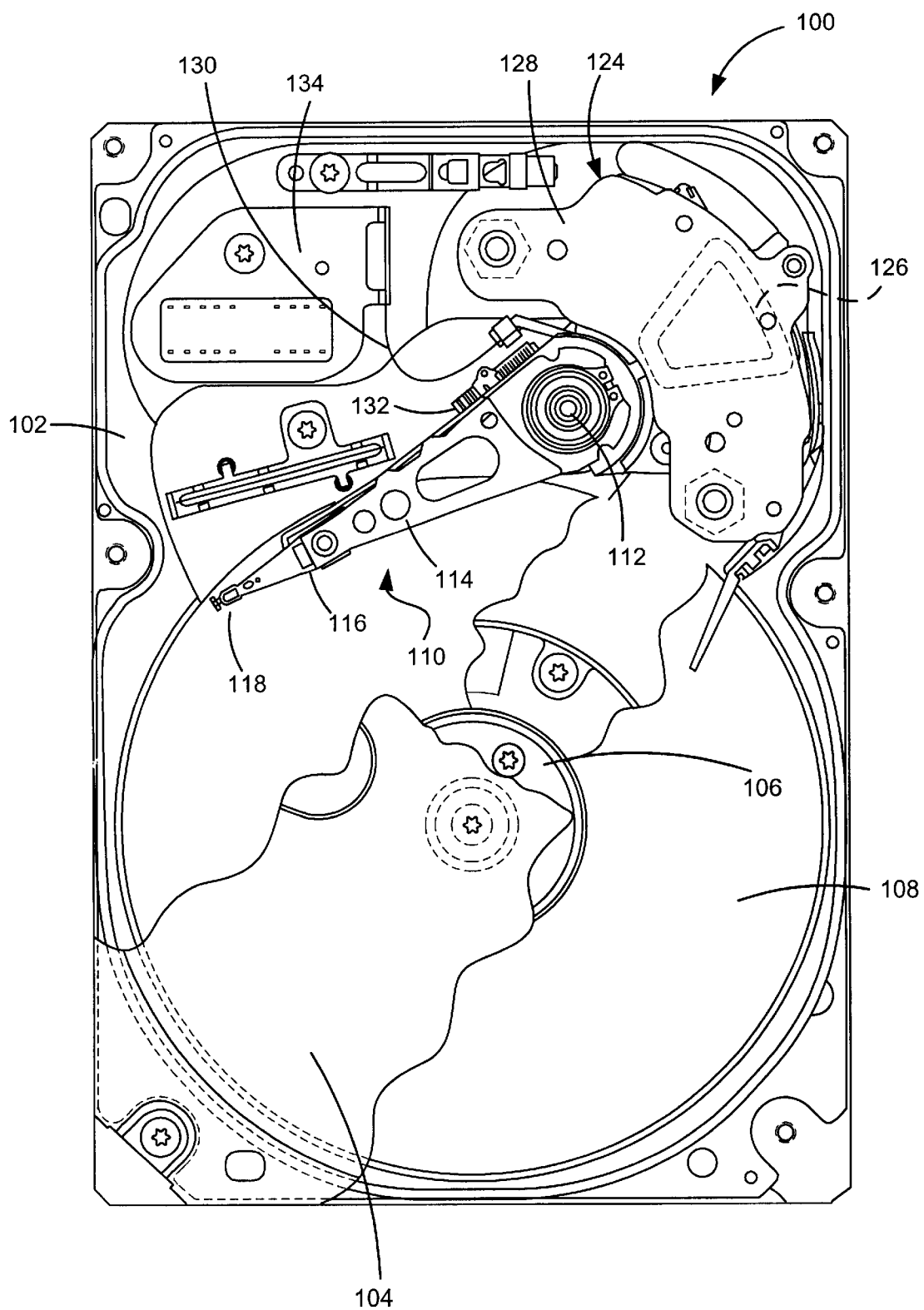
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer or read/write head 118, which includes an air-bearing slider enabling the read/write head 118 to fly in close proximity above the corresponding surface of the associated disc 108. A read element (not shown) and a write element (not shown) are located on the read/write head 118 and are used to retrieve and store information on the disc 108.

During a seek operation, the track position of the read/write heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the read/write heads 118 are caused to move over the surfaces of the discs 108.

The spindle motor 106 is typically de-energized when the disc drive 100 is not in use for extended periods of time. The read/write heads 118 are preferably moved over park zones near the inner diameter of the discs 108 when the drive motor is de-energized. The read/write heads 118 can be secured over the park zones through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly 130 includes a preamplifier 132 to which head wires (not shown) are connected; the head wires, also called head element electrical leads, being routed along the actuator arms 114 and the flexures 116 to the heads 118. The preamplifier 132 amplifies read signals generated by the heads 118 during a read operation. The flex assembly 130 terminates at a flex bracket 134 for communication through the base deck 102 to a disc drive printed circuit board (not shown) mounted to the bottom side of the disc drive 100. The printed circuit board includes a controller (not shown) that is capable of managing read and write operations (among others). Alternatively, the controller may be located external to the disc drive 100. The write operation, managed by the controller, includes applying a write current to the write element via the write element electrical leads.

Figure 2:
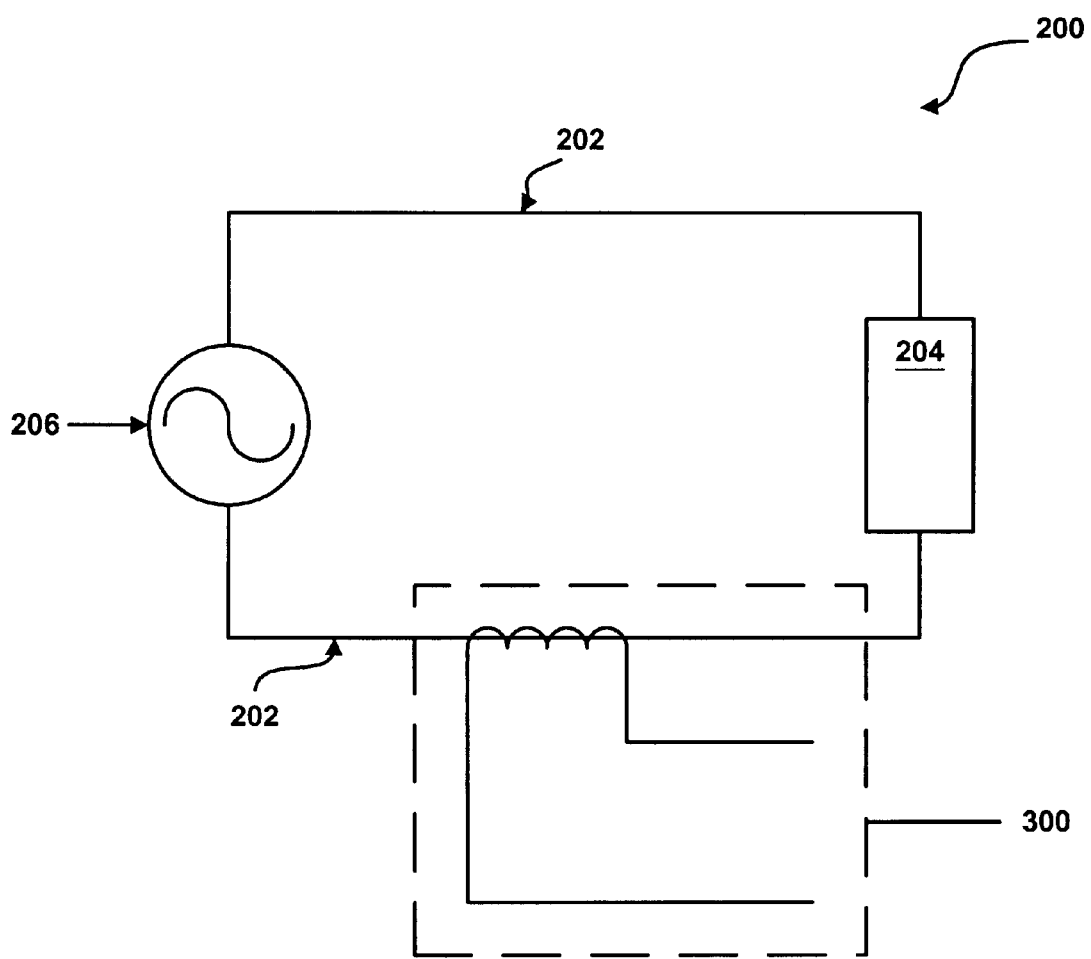
FIG. 2 illustrates a simplified representation of a preferred embodiment of the present invention.

FIG. 2 illustrates a simplified representation of a preferred embodiment of the present invention. Write circuit 200 of disc 100 has write element electrical leads 202 connected to a write element 204. A current is sent, through the write element electrical leads 202, to the write element 204 by the disc drive 100 controller during a write operation. The magnitude of the write current varies in relation to the spacing between the head 118 and the disc 108. For example, the magnitude of the write current applied during a write operation at the inner diameter ("ID") of the disc 100 is typically relatively smaller than the magnitude of the write current applied during a write operation at the outer diameter ("OD") of the disc 100. The difference in magnitude is attributable to slight differences in the fly height of the head 118 due to differing wind velocities created by the rotating disc 108 at the ID and at the OD.

Current source 206 represents the current sent by the controller. The write element electrical leads 202 are considered as the transmission lines of circuit 200, and write element 204 is, in effect, the load of circuit 200. The load (i.e., write element 204) absorbs substantially the entire current signal sent through the transmission lines (i.e., the write element electrical leads 204) when the impedance of the load matches the impedance of the transmission lines. Current source 206, however, sees a reflected signal coming back down the transmission lines when the impedance of the load and the impedance of the transmission lines are not matched.

An impedance match is difficult to obtain, and difficult to maintain. The impedance of the write element 204, for example, has both an inductive and a capacitive component that reflects a portion of the current signal back to the current source 206. The voltage standing wave ratio ("VSWR") is a measure of the amount of signal reflected by the write element due to the impedance imbalance between the write element 204 and the current source 206 and transmission lines 202.

During a "nominal" write operation, the flying height of the write element 204 remains relatively constant across the disc surface. Each time a write operation takes place, the write current (in the write element 204 and the write element electrical leads 202) changes directions many times. A portion of the voltage generated across the write element 204 is reflected back towards the current source 206 each time the write current changes direction. If the write element 204 presented a theoretically perfect impedance match to the connecting write element electrical leads 202 and current source 206, however, there would be no reflected voltage.

The impedance of the write element 204, whatever its value, creates a reflection coefficient (i.e., an amount of reflected signal) that is stable during a nominal write operation. If the fly height of the write element 204 changes, the inductive and capacitive characteristics of the write element 204 (relative to the write element electrical leads 202 and the current source 206) also changes. The change in inductive and capacitive characteristics cause a corresponding change in the impedance of the write element 204 relative to the write element electrical leads 202 and current source 206, and hence, a change in the signal reflected by the write element 204. Therefore, a change in the write element 204 characteristics, such as a change in the fly height caused by a skip write error, can be detected by monitoring the reflected voltage over a suitable time period.

In a preferred embodiment of the present invention, a baseline signal, reflected during a nominal write operation by write element 204, is determined. The baseline signal is used as a reference signal against which the instantaneous reflected signal is compared to indicate a change in the impedance of the write element 204 due to a change in fly height. For example, an increase in the fly height of the write element 204 causes the impedance of the write element 204 to change, which in turn, causes the amplitude of the reflected signal to increase. Embodiments of the present invention permit a change in fly height, be it an increase or a decrease, to be detected by comparing the instantaneous reflected signal to the baseline signal. In a preferred embodiment of the present invention, the reflected signal is monitored by inductively coupling a circuit 300 to the write circuit 200.

Figure 3:
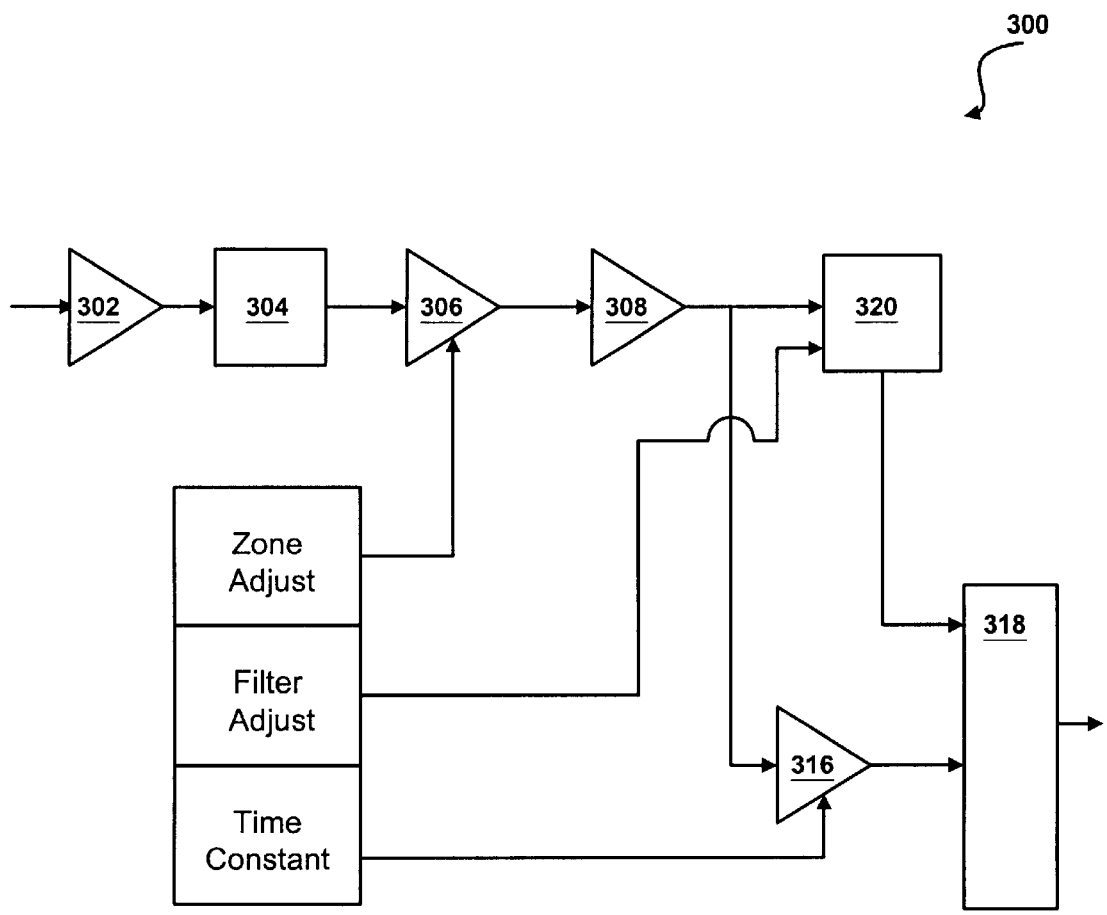
FIG. 3 illustrates a circuit for determining the read/write head fly height according to a preferred embodiment of the present invention.

Circuit 300 for determining the read/write head 118 fly height according to a preferred embodiment of the present invention is shown in FIG. 3. The circuit 300 is inductively coupled to the write circuit 200 in such a way as to minimize any undesired interaction between the two circuits, but at the same time allowing the circuit 300 to sample the reflected voltage component generated each time a write current is generated in the write circuit 200. The reflected signal sampled by the circuit 300 is sent to the input of amplifier 302. Amplifier 302 is used to increase the amplitude of the reflected signal. Amplifier 302 is implemented using any amplifier chip or other electrical component(s) that increases the amplitude of an input signal.

The amplified signal then passes through low-pass filter 304. In a preferred embodiment of the present invention, low-pass filter 304 is used to eliminate any unwanted high frequency components present in the amplified signal. For example, low-pass filter 304 eliminates high frequency components caused by expected variations in fly height (such as from wind turbulence and head assembly 110 mechanical forces among others). Low-pass filter 304 can be implemented using either active (transistors and op-amps among others) or passive devices (capacitors, resistors, and inductors among others).

The filtered signal is then sent to variable-gain-amplifier ("VGA") 306. VGA 306 is an adjustable amplifier used to increase the amplitude of the filtered signal. VGA 306 is adjusted to compensate for the different write current magnitudes that are applied to the write circuit depending on the radial location of the write element 204 relative to the disc 108. For example, the fly height of the read/write head 118 is lower at the inner diameter of the disc 108 because the air speed encountered by the head 118 is lower than that encountered at the outer diameter of the disc 108. To compensate for the lower fly height, a smaller magnitude write current is applied when the head 118 is located nearer the inner diameter to prevent adjacent tracks from being overwritten.

In a preferred embodiment, the disc 108 is radially divided into "zones," each zone having a corresponding "zone adjust" value that is input into the VGA 306. A zone adjust value is selected according to the fly height of the head 118 corresponding to the head's 118 radial position relative to the disc 108. The zone adjust value is selected through the use of micro-code or software among others. VGA 306 is implemented using any amplifier chip or other electrical component(s) that increases the amplitude of an input signal by a selectable gain amount. The output of VGA 306 is transmitted to a full-wave rectifier 308.

Full-wave rectifier 308 recovers the DC equivalent component of the output signal of VGA 306. Full-wave rectifier 308 can be implemented using transistors, op-amps, diodes, and resistors among others components. The DC equivalent component of the rectified signal, as found by full-wave rectifier 308, is sent to both sample-and-hold circuit 316 and to filter 320.

The sample-and-hold circuit 316 is designed to retrieve the DC equivalent component of the rectified signal, and upon receiving a hold command, output the value of the DC component possessed when the hold command was issued. The hold command is issued for a specified time, called the time constant. The sample-and-hold circuit 316, in a preferred embodiment, has a time constant equal to the amount of time required for the read/write head 118 to travel over a finite number of sectors on the disc 108. The time constant is reset when the controller is completing a seek operation and moving the read/write head 118 to another location on the disc 108.

The time constant is selected according to which "zone" of the disc 108 the read/write head 118 is flying over. A zone consists of a group of adjacent tracks on the disc 108. A track is placed into a zone according to the time required for the head 118 to travel over a sector in the track. The time required varies for each zone due to the different linear speeds of the disc 108 encountered by the head 118 at various radial locations. For example, the amount of time needed for the head 118 to traverse a sector in a zone located at the outer diameter of disc 108 is different than the amount of time needed in a zone located at the inner diameter of the disc 108 because the linear speed of the disc 108 seen by the head 118 is greater at the outer diameter of the disc 108. The time constant is selected through the use of micro-code or software among others. After the time set by the time constant expires, the sample-and-hold circuit 316 releases and another sample of the DC component is taken. The output of the sample-and-hold circuit 316 is sent to an input of comparator circuit 318.

Filter 320 also receives the DC equivalent signal from full-wave rectifier 308. Filter 320 is an adjustable filter that is controlled by micro-code or software among others located in the controller or on the computer system to which the disc drive 100 is attached. Filter 320 is adjusted to eliminate unwanted signal components that arise due to the read/write head 118 being located at different radial zones of the disc 108. For example, filter 320 allows adjustments to the slope of the DC equivalent signal sent from the full-wave rectifier 308. The adjustments are made to compensate for signal changes that arise as the head 118 traverses different zones on the disc 108. The signal changes are related to the change in the relative velocity of the head 118 to the disc 108. The output of filter 320 is sent to an input of comparator circuit 318.

Comparator circuit 318 compares the output from the sample-and-hold circuit 316 to the output of the filter 320. The output of the sample-and-hold circuit 316 represents the baseline signal, or the baseline value of the VSWR signal reflected by the write element 204. The output of filter 320, on the other hand, represents the instantaneous signal, or the instantaneous value of the VSWR signal reflected by the write element 204. The difference between the output of filter 320 and the output of sample-and-hold circuit 316 represents a change in the impedance of write element 204 that has occurred within the period set by the sample-and-hold circuit 316 time constant. If the difference between the output of filter 320 and the output of sample-and-hold circuit 316 exceeds a predetermined acceptable range, comparator circuit 318 outputs a "set error" signal, or signals the controller to inhibit the write operation and/or begin a rewrite operation.

Figure 5:
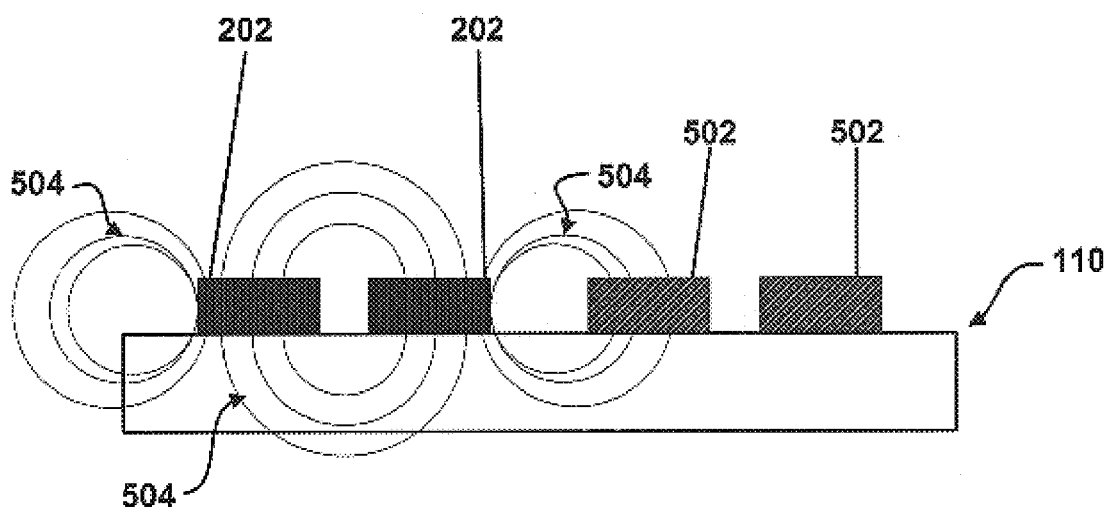
FIG. 5 is a simplified cross-sectional representation of a preferred embodiment of the read/write head illustrating the coupling of the circuit of FIG. 3 to the write circuit of FIG. 2.
Figure 6:
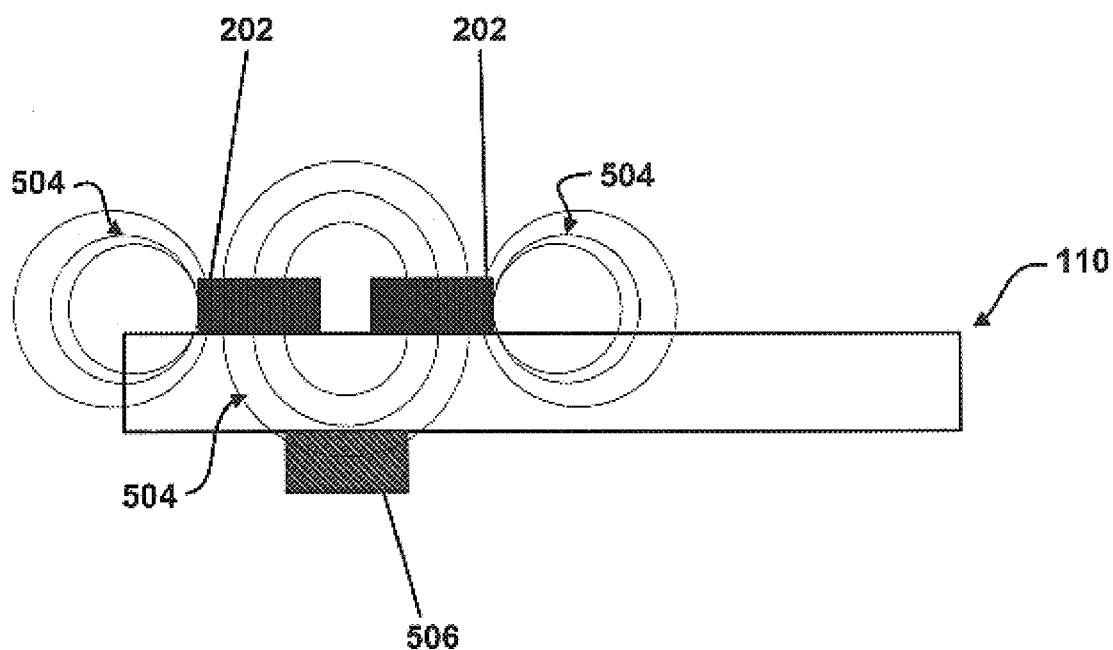
FIG. 6 is a simplified cross-sectional representation of an alternative embodiment of the coupling of the circuit of FIG. 3 to the write circuit of FIG. 2 on the read/write head.

In a preferred embodiment of the present invention, circuit 300 is embedded on the preamplifier 132, before the head select matrix, such that a single circuit 300 can monitor the fly height of every read/write head 118 of the disc drive 100. The inputs to amplifier 302 are located in a position (for example 502 and 506 as shown in FIG. 5 and FIG. 6, respectively) such that the magnetic field 504 generated by the write current and instantaneous signal passing through the write element electrical leads 202 inductively couple the circuit 300 to the write circuit 200.

Figure 4:
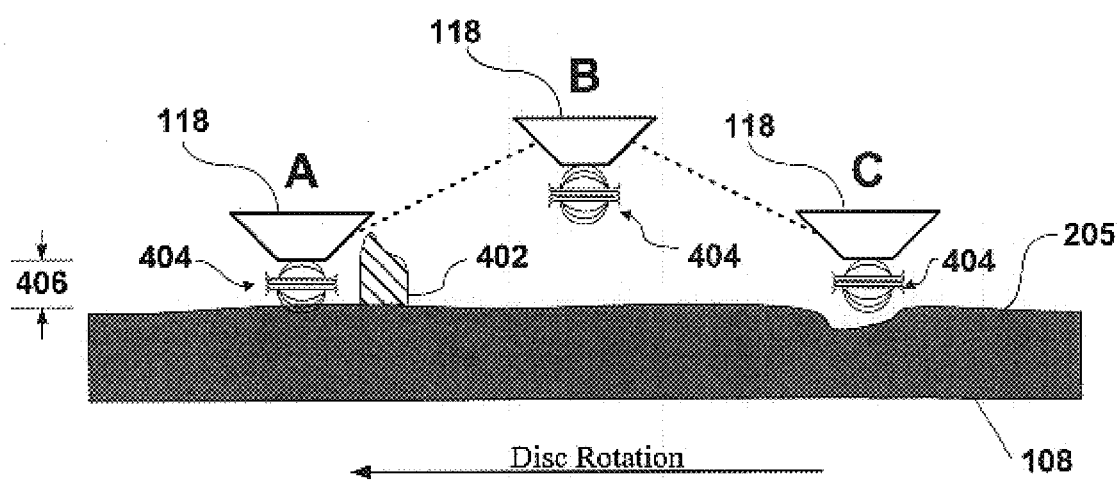
FIG. 4 illustrates a skip write condition addressed by an embodiment of the present invention.

FIG. 4 illustrates a skip write condition addressed by embodiments of the present invention. The read/write head 118 is shown in various locations (i.e., positions "A", "B", and "C") relative to the surface 205 of the rotating disc 108. Read/write head 118 is shown at its nominal fly height 406 in position A. The strength of the magnetic field 404, relative to the disc 108, generated in read/write head 118 during a write operation is sufficient to orient the magnetic domains on the disc 108 surface at position A. Therefore, any information that was being written to the disc 108 while the read/write head 118 was located at its nominal flying height 406 is adequately stored on the disc 108.

Read/write head 118, as shown in FIG. 4, encounters a contaminate particle 402 as disc 108 rotates. Upon contact, contaminate particle 402 causes read/write head 118 to "bounce" and move away from the surface of disc 108 as shown in position B. The strength of the magnetic field 404 relative to the disc 108, generated in read/write head 118 during a write operation, is not sufficient to orient the magnetic domains during a skip write condition. Therefore, any information that was being written to the disc during this "bounce" or skip write is not adequately stored on the disc 108. The manufacturer determines an acceptable amount that the read/write head 118 may deviate from the nominal fly height 406 beyond which a rewrite operation is implemented. This acceptable amount of fly height 406 deviation will correspond to an acceptable range in the difference between the baseline signal and the instantaneous signal. If the difference does not fall within the acceptable range (i.e., if the read/write head 118 moves too far away from, or too close to, the disc 108), a rewrite operation is implemented. For purposes of the description, a threshold limit VSWR is defined as the particular VSWR signal associated with either the upper or lower limit in the acceptable range of the instantaneous signal. Nominal disc operation continues, on the other hand, if the difference between the baseline reflected signal and the instantaneous reflected signal is within the acceptable range.

Read/write head 118 then attempts to return to its nominal flying height 406 after reaching its peak at position B. Imperfections on the disc's 108 surface, for example, may prevent the nominal flying height 406 from being reached. Position C shows such a disc 108 surface imperfection. The strength of the magnetic field 404, relative to the disc 108, generated by the write element during a write operation may still be sufficient, however, to orient the magnetic domains at position C. The manufacturer, in this case, may have determined that the deviation from nominal fly height 406 does not warrant a rewrite procedure. In other words, the difference between the baseline signal and the instantaneous signal caused by a slight deviation from the nominal fly height 406 did not exceed the acceptable range set by the manufacturer.

It should be noted that embodiments of the present invention monitor the fly height 406 of the read/write head 118 relative to the disc 108 surface. Although an acceptable range corresponding to a maximum deviation from the nominal fly height 406 (regardless of whether the read/write head 118 is moving closer to or farther away from the disc 108) has been used to illustrate the preferred embodiment, embodiments of the present invention allow a maximum fly height and a minimum fly height to be selected independently by separately determining a maximum acceptable range limit and a minimum acceptable range limit. This allows the manufacturer to adjust the acceptable range of fly height to account for greater write operation sensitivity to variations in one direction relative to the other. Rewrite procedures are implemented if the difference between the baseline reflected signal and the instantaneous reflected signal is not within the acceptable range (i.e., the fly height becomes lower than the lower limit or higher than the upper limit).

FIG. 5 illustrates a preferred embodiment of coupling circuit 300 to the write circuit 200 for the present invention. FIG. 5 illustrates a cross section of the read/write head 118 showing the write element electrical leads 202 next to the read element electrical leads 502 in a typical configuration. A magnetic field 504 surrounding the write element electrical leads 202, distinct from the magnetic field 404 generated by the write element 204, is generated when a current is sent through the leads 202 to the write element 204 during a write operation. Magnetic field 504 has components of the write current sent to the write element 204 and components of the signal reflected by the write element 204. Magnetic field 504 encompasses a portion of the read element electrical lead 502, thereby inducing a signal within the read element electrical lead 502. The signal induced in the read element electrical lead 502 is input into the circuit 300 to determine the fly height of the write head 204 during the write operation.

The read circuit (including the read element and the read element electrical leads 502) is usually short circuited during a write operation because the signals induced in the read circuit by the write current can easily damage the sensitive read element. In a preferred embodiment of the present invention, a reduction circuit reduces the amplitude of the signal induced within the read circuit to a reliable level. However, any method of protecting the read element from excessive currents may be used. The reduction circuit may include components such as diodes, transistors, and resistors among others to reduce the induced signal to a reliable level. The reduction circuit is switched into the read circuit when a write operation is implemented and switched out of the read circuit when a read operation is implemented. Although shown on the read/write head 118 beside the write element electrical leads 202 in FIG. 5, read element electrical leads 502 can be located in any configuration and at any position along the actuator assembly 110 where the magnetic field generated by current flowing through the write element electrical leads 202 induces a signal within a portion of read element electrical leads 502.

Trace 506, in an alternative embodiment shown in FIG. 6, is deposited on the read/write head 118 so that the magnetic field 504, containing components of the write current and components of the reflected signal, passes through a portion of trace 506. Trace 506 is any conductor deposited or placed next to the write circuit 200 such that a magnetic field 504 generated by the write circuit 200 induces a signal in a portion of trace 506. A signal is created within trace 506 when the magnetic field 504 passes through trace 506. The signal induced in trace 506 is input into the circuit 300 to determine the fly height of the write head 204 during the write operation. Although shown underneath the write element electrical leads 202 in FIG. 6, trace 506 can be located at any position where the magnetic field generated by current flowing through the write element electrical leads 202 induces a signal within trace 506. A reduction circuit is not needed with trace 506 because trace 506 is not connected to a read element.

Figure 7:
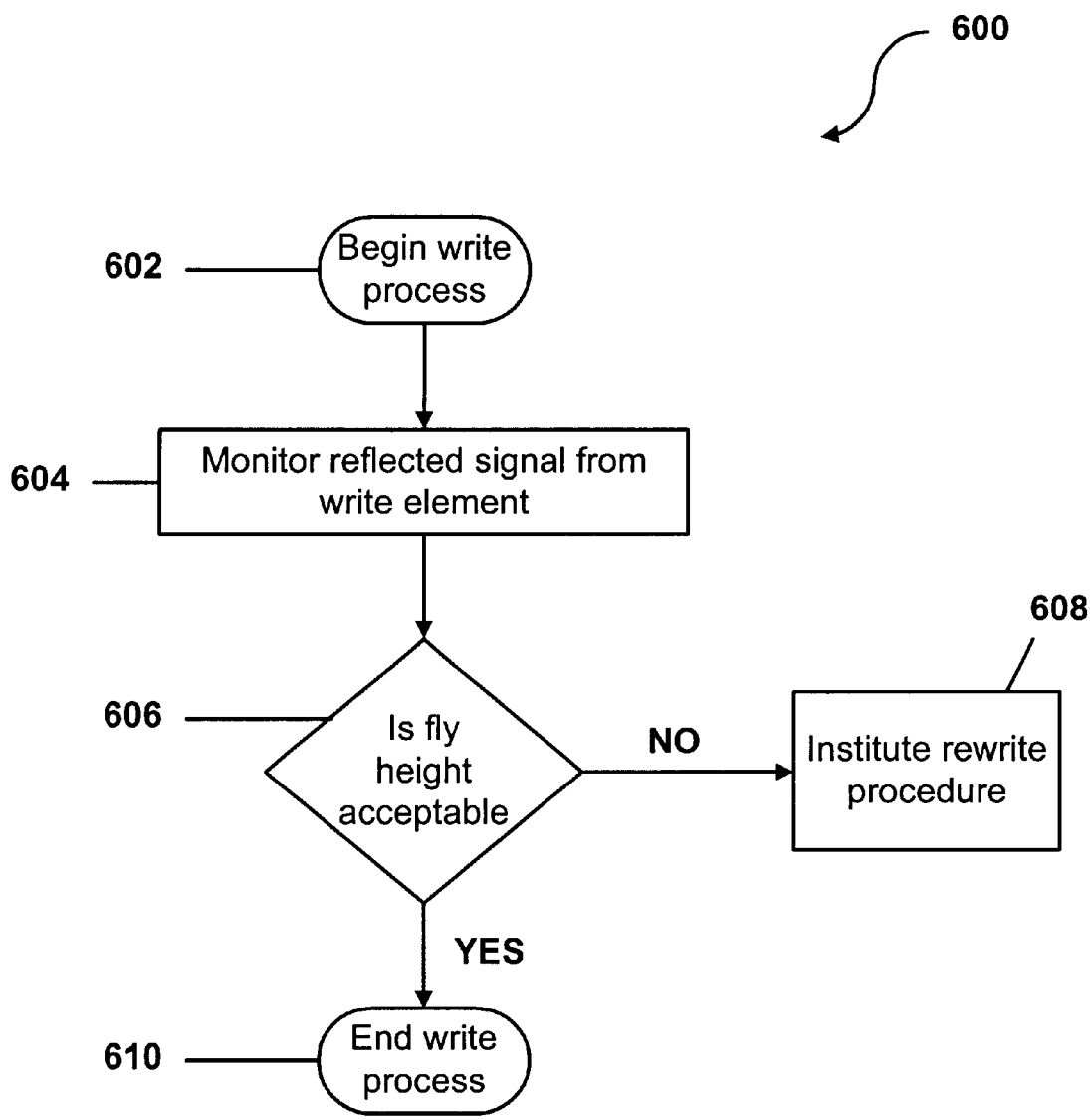
FIG. 7 is a flow chart of an operational process for determining whether the write element fly height is acceptable according to a preferred embodiment of the present invention.

FIG. 7 is a flow chart of the operational process 600 for determining whether the write element fly height is within the acceptable range according to a preferred embodiment of the present invention. Operational process 600 is implemented when write process 602 begins. A write process 602 in a disc drive 100 may include, among other steps, transmitting a write current through the write element electrical leads 202 to the write element 204 such that a magnetic field 404 is generated by the write element 204 and information is stored to disc 108. In a typical disc drive 100, the disc controller sends the write current through the preamplifier 132, across the write element electrical leads 202, and through the write element 204. Although a typical magnetic media disc drive 100 has been used to illustrate the preferred embodiment, the present invention can be applied to storage devices that use a different write process than described herein.

Operation 604 assumes control after the write process 602 begins. The signal reflected by the write element 204, due to a mismatch in impedance between the write element 204 and the current source 206 and write element electrical leads 202, is monitored in operation 604. The signal is monitored in operation 604 by inductively coupling a circuit 300 to the write circuit 200. The amount of signal reflected corresponds to the fly height of the write element 204.

Determination operation 606 then assumes control from operation 604. Determination operation 606 ascertains whether the fly height of the write element 204 is acceptable during the write process 202. Determination operation 606 compares the instantaneous signal reflected by the write element to the baseline signal. If the instantaneous signal varies from the baseline signal by more than a predetermined acceptable range, a skip write error is likely detected. The acceptable range in signal difference corresponds to the allowable range deviation from the nominal fly height 406 of the write element 204. The acceptable range, therefore, indicates whether the write element 204 fly height is too high and/or too low. The acceptable range is set by the manufacturer to provide reliable data storage.

Operational control branches NO if the instantaneous reflected signal differs from the baseline signal by more than the predetermined acceptable range and operation 608 assumes control. Operation 608 institutes a rewrite procedure 800. If the difference between signals is within the predetermined acceptable range, the data is considered safely written and operational control branches YES. Operation 610 then assumes control and the successful write process 602 is completed.

Figure 8:
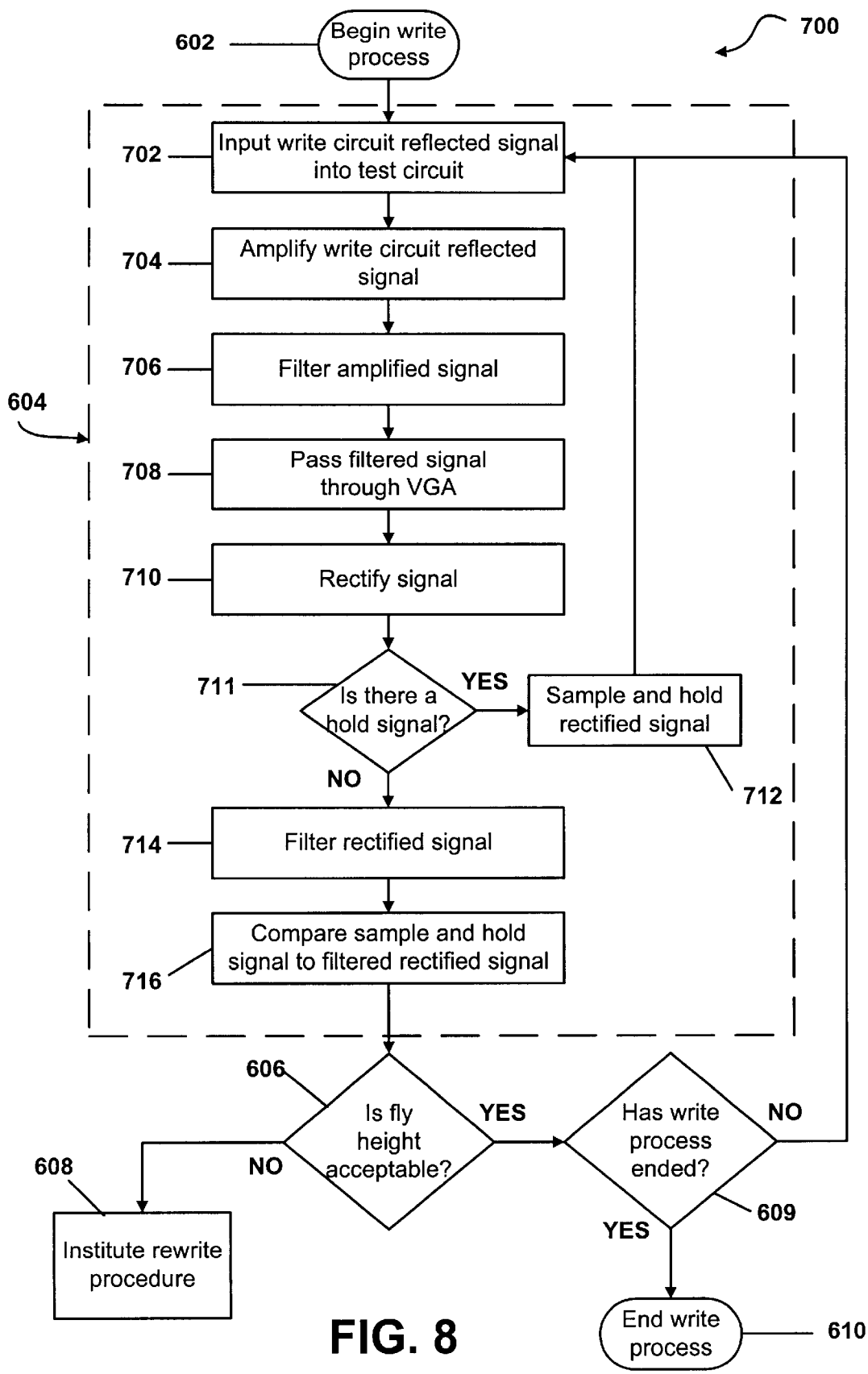
FIG. 8 illustrates a detailed embodiment of an operational process for determining the write element fly height according to a preferred embodiment of the present invention.

FIG. 8 illustrates a detailed embodiment of operational process 700 for determining the write element 204 fly height according to a preferred embodiment of the present invention. Operational process 700 is implemented when write process 602 begins. A write process 602 in a disc drive 100 may include, among other steps, transmitting a write current through the write element electrical leads 202 to the write element 204 such that a magnetic field 404 is generated by the write element 204 and information is stored to disc 108. In a typical disc drive 100, the disc controller sends the write current through the preamplifier 132, across the write element electrical leads 202, and through the write element 204. Although a typical magnetic media disc drive 100 has been used to illustrate the preferred embodiment, embodiments of the present invention can be applied to storage devices that use a different write process than described herein.

Operation 702 begins once operation 602 begins the write process. Operation 702 inputs the signal being reflected by the write element 204 into the circuit 300. The circuit 300 is inductively coupled to the write circuit 200 such that the circuit 300 detects any change in the reflected signal of the write circuit 200. For example, a change in the fly height of the write element 204 causes a change in the impedance of the write element 204 relative to the write circuit 200. The change in impedance causes a change in the amplitude of the signal reflected by the write element 204. The change in the reflected signal is detected by the circuit 300 and is used to monitor the fly height of the write element 204.

Operation 704 amplifies, or increases the amplitude of, the reflected signal detected by operation 702. The amplifier used by operation 704 can be implemented using an amplifier chip or other electrical component(s). In a preferred embodiment of the present invention, amplifier 302 is used to increase the amplitude of the reflected signal. Operation 704 surrenders control to operation 706 after the reflected signal is amplified.

Operation 706 filters the amplified reflected signal. In a preferred embodiment of the present invention, low-pass filter 304 is used to eliminate any unwanted high frequency components present in the amplified signal. For example, low-pass filter 304 eliminates high frequency components caused by expected variations in fly height (such as from wind turbulence and head assembly 110 mechanical forces among others). Low-pass filter 304 can be implemented using either active (transistors and op-amps among others) or passive devices (capacitors, resistors, and inductors among others).

Operation 708 assumes control from operation 706 after the amplified signal is filtered. Operation 708 adjusts the amplitude of the filtered signal of operation 706. Operation 708 accounts for the differing write current amounts that are applied to the write circuit 200 depending on the radial location of the read/write head 118 relative to the disc 108. In a preferred embodiment of the present invention, the filtered signal is adjusted by VGA 306. VGA 306 is a variable-gain-amplifier used to increase the amplitude of the filtered signal by a selected amount. VGA 306 is adjusted to compensate for the different write current magnitudes that are applied to the write circuit within the different radial zones of the disc 108. Each zone has a corresponding "zone adjust" value that is input into the VGA 306. The zone adjust value is selected through the use of micro-code or software among others. VGA 306 is implemented using any amplifier chip or other electrical component(s) that increases the amplitude of an input signal. The output of operation 708 is then transferred to operation 710.

Operation 710 recovers the DC equivalent component of the output of operation 708. Operation 710 uses a rectifier to recover the DC equivalent component of the output of operation 708. In a preferred embodiment of the present invention, full-wave rectifier 308 is used to recover the DC equivalent component of the output of the VGA 306 used in operation 708. The full-wave rectifier 308 can be implemented using transistors, op-amps, diodes, and resistors among others components. Operation 710 then transfers control to determination operation 711.

Determination operation 711 ascertains whether the baseline signal has been sampled and held for each write process by determining if there is a hold signal from the controller or some other device. Presence of a hold signal indicates that a new baseline signal should be sampled and held, such as at the initiation of the write process. Operational control branches YES if there is a hold signal and control is transferred to operation 712. If there is no hold signal, control is transferred to operation 714.

Operation 712 takes the rectified signal from operation 710 and stores the rectified signal upon receiving a hold signal from the controller or other device. Operation 712 then transfers control to operation 702. Operation 712 holds the value of the rectified signal constant for a period of time for use in operation 716. In a preferred embodiment of the present invention, operation 712 employs a sample-and-hold circuit 316, which is designed to retrieve the DC equivalent component of the rectified signal from the full-wave rectifier 308 of operation 710, and upon receiving a hold command, hold constant the value of the DC component it possessed when the hold command was issued. The sample-and-hold circuit 316 outputs this value until the hold command is released. The hold command can be issued for a specified time, called the time constant. The sample-and-hold circuit 316 in operation 712 has a time constant equal to the amount of time required for the read/write head 118 to traverse a finite number of sectors on the disc 108. Operation 712 resets the time constant when the controller is completing a seek operation and moving the read/write head 118 to another location on the disc 108. The time constant is reset to compensate for the different linear speeds of the disc 108 encountered at various radial locations.

The time constant is selected according to which "zone" of the disc 108 the read/write head 118 is flying over. A zone consists of a group of adjacent tracks on the disc 108. A track is placed into a zone according to the time required to for the head 118 to traverse a sector in the track. The time required varies for each zone due to the different linear speeds of the disc 108 encountered by the head 118 at various radial locations. For example, the amount of time needed for the head 118 to traverse a sector in a zone located at the outer diameter of disc 108 is different than the amount of time needed in a zone located at the inner diameter of the disc 108 because the linear speed of the disc 108 seen by the head 118 is greater at the outer diameter of the disc 108. The time constant can be selected through the use of micro-code or software among others. After the time set by the time constant expires the sample-and-hold circuit 316 releases, a new hold command is issued, and another sample of the DC component is taken. Operation 712 transfers control to operation 702.

Operation 714 also accepts the rectified signal from operation 710. Operation 714 filters the rectified signal from operation 710. In a preferred embodiment, high-pass filter 320 is used to eliminate any unwanted low frequency components present in the rectified signal. High-pass filter 320 can be implemented using either active (transistors and op-amps among others) or passive devices (capacitors, resistors, and inductors among others). High-pass filter 320 is an adjustable filter that is controlled by micro-code or software among others located in the controller or on the computer system to which the disc drive 100 is attached. Filter 320 is adjusted to eliminate unwanted signal components that arise due to the read/write head 118 being located at different radial zones of the disc 108. Operation 714 transfers the output of the filter to operation 716.

Operation 716 accepts the output from operation 712 and the output from operation 714. Operation 716 then compares the output from operation 712 to the output of operation 714. The output of operation 712, because it was held constant for a specified time, represents a baseline value for the signal reflected by the write element 204. On the other hand, the output of operation 714 represents the change in the signal reflected, during the time specified by the time constant, caused by a change in the fly height of the write element 204. In other words, the difference between the output of operation 712 and the output operation 714 represents the change in the impedance of write element 204 that has occurred within the time that operation 712 has held the DC equivalent component of operation 710 constant.

In a preferred embodiment of the present invention, operation 716 uses the comparator circuit 318 to compare the output of the sample-and-hold circuit 316 utilized by operation 712 to the output of the high-pass filter 320 utilized by operation 714. Operational control then passes to determination operation 606.

Determination operation 606 ascertains whether the fly height of the write element 204 is acceptable during the write process 202. Determination operation 606 compares the output of operation 716 (i.e., the difference between the instantaneous signal reflected by the write element and the baseline signal reflected by the write element) to a predetermined acceptable range of signal differences that correspond to a range of acceptable fly heights for the write element 204. The acceptable range is set by the manufacturer to provide for reliable data storage. If the difference found in operation 716 is not within the predetermined acceptable range, a skip write error is likely detected. In that case, operation 606 control branches NO and operation 608 assumes control. Operation 608 institutes the rewrite procedure 800.

If the difference between the output of operation 714 (i.e., the instantaneous reflected signal) and the output of operation 712 (i.e., the baseline signal) is determined to be within the acceptable range by operation 606, the data is considered reliably written and operational control branches YES, transferring control to operation 609.

Determination operation 609 ascertains whether the write process is ongoing or has been completed. If the write process is ongoing, operation 609 transfers control to operation 702 so that the fly height of the write head 204 is monitored throughout the write process. Upon completion of the write process, determination operation 609 will transfer control to operation 610 ending the write process.

Figure 9:
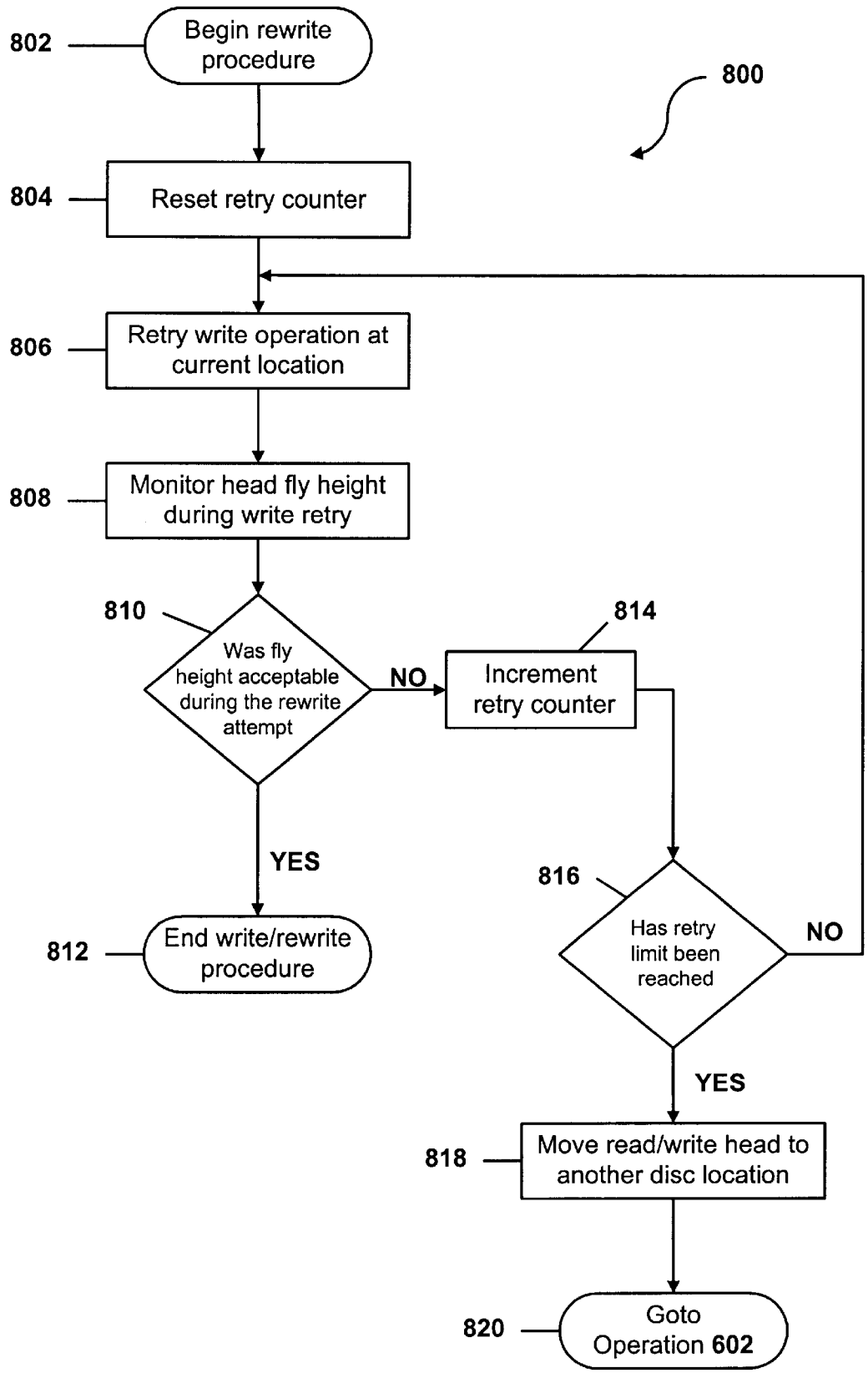
FIG. 9 is a flow chart of an operational process for rewriting data if a skip write is detected according to a preferred embodiment of the present invention.

FIG. 9 illustrates a rewrite process 800. In a preferred embodiment of the present invention, rewrite process 800 is implemented if a skip write condition is detected. Operation 802 begins the rewrite procedure after being triggered by operation 608 of the initial write process. Once the rewrite process 800 is started by operation 802, operation 804 assumes control and resets a "retry" counter. The retry counter is used to keep track of the number of attempts that have been made to write information to a specific, or desired, location on the disc 108. The manufacturer can configure the control system to write the data at another location on the disc 108 surface or return an error message among other things after a certain amount of rewrite attempts have failed.

Operation 806 assumes control after the retry counter is reset by operation 804. Operation 806 attempts to rewrite the data to the same location as attempted by the previous write process. Non-repeatable errors such as those caused by vibration, external shock, minor disc surface defect or a contaminate particle among others can be overcome by rewriting the data to the same location as the previous write process.

Operation 808 assumes control after operation 806 begins. Operation 808 monitors the write element fly height during the rewrite attempt of operation 806. In a preferred embodiment, operation 808 utilizes operation 604 to monitor the write element fly height.

After operation 808 is completed, determination operation 810 ascertains whether the write element fly height was acceptable during the rewrite attempt. Operational control branches YES if the write element fly height was acceptable and the write/rewrite procedure is terminated by operation 812.

Operational control branches NO if the write element fly height was unacceptable and operation 814 assumes control. Operation 814 increments the retry counter. As previously mentioned, the retry counter is used to keep track of the number of attempts that have been made to write information to a specific location on the disc 108. The manufacturer can configure the control system to write the data at another location on the disc 108 or return an error message among other things after a certain amount of rewrite attempts have failed.

Determination operation 816 assumes control after operation 814 increments the retry counter. Determination operation 816 compares the value stored in the retry counter to a predetermined retry limit. The retry limit can be set by the manufacturer to compensate for non-repeatable errors, such as vibration, external shock, minor disc surface defects, or contaminate particle among others, that cause a write operation to fail. By allowing multiple attempts at writing the data to the same location, the disc drive controller will not mark that disc location as damaged or defective until the retry limit has been reached.

Control branches NO if the retry counter has not reached the retry limit and the rewrite process repeats beginning at write operation 806. Control branches YES if the retry counter has reached the retry limit and operation 818 assumes control. Operation 818 moves the read/write head 118 to another location on the disc 108. Operation 818 may also include recording the location where the rewrite process failed as being "damaged" or unusable so that future write operations will not be attempted at that location. Furthermore, operation 818 may also include, among others, automatically instituting remedial procedures or notifying the user to institute remedial procedures to repair the "damaged" disc 108 location.

Operation 820 shifts control to write operation 602 after operation 818 has repositioned the read/write head 118 over a new storage location on the disc 108. Operation 602 assumes control and attempts to write the data at the new location. Although operation 800 illustrates a preferred embodiment of the present invention, various other methods of rewriting data after a skip write error has likely been detected can be employed with embodiments of the present invention.

Embodiments of the present invention offer an apparatus and associated method of determining whether the write head remained in close proximity to the storage media surface in order to write data to the storage media. More specifically, embodiments of the present invention eliminate the need to read the information just written to the storage media surface in order to determine whether the write head properly wrote the data.

In summary, embodiments of the present invention can be viewed as an apparatus and associated method of determining the fly height of a read/write head (such as 118) relative to a data storage media (such as 108) in a data storage device (such as 100) by monitoring a reflected signal from the write element (such as 204). A method (such as shown in operational flow process 600) can be viewed as comprising the steps of writing data to a desired location on the data storage media and determining the fly height of the write element (such as 204) of the read/write head by monitoring a reflected signal from the write element.

A method (such as operational flow process 700) comprises the steps of detecting the reflected signal with a circuit (such as 300), amplifying the reflected signal with an amplifier (such as 302), and filtering the amplified signal with a filter (such as 304). The filtered signal is then amplified again using a variable-gain amplifier (such as 306) and then rectified with a rectifier (such as 308). The rectified signal is then both sampled and held for a specified time constant by a sample-and-hold circuit (such as 316), and filtered by an adjustable filter (such as 320). The time constant of the sample-and-hold circuit is chosen relative to the data zone to which data is being written. Finally, the sampled and held signal is compared to the adjustable filter output in a comparator circuit (such as 318).

The apparatus and associated method can be viewed as further comprising determining whether the fly height is within a predetermined range of fly heights. The predetermined range of fly heights corresponds to an acceptable range of difference between the instantaneous reflected signal and a baseline signal. If the difference between the instantaneous reflected signal and the baseline signal is not within the acceptable range, a skip write error is likely detected.

The apparatus and associated method can be viewed as further comprising suspending the write operation (such as 602) if the read/write head fly height is not within a predetermined range of fly heights, and implementing a rewrite procedure (such as shown in operational flow process 800).

Additionally, the circuit (such as 300) of the apparatus can be viewed as having an amplifier circuit (such as 302) connected to a filter (such as 304). The filter is connected to a variable-gain-amplifier (such as 306) and the variable-gain-amplifier is connected to a rectifier (such as 308). The rectifier circuit is connected to both a sample-and-hold circuit (such as 316) and to an adjustable filter (such as 320). The sample-and-hold circuit and the adjustable filter are connected to a comparator circuit (such as 318).

The apparatus can be viewed as having a circuit (such as 300) inductively coupled to a write circuit (such as 200) such as by a read element electrical lead (such as 502). Alternatively, a trace conductor (such as 506) inductively couples the circuit to the write circuit.

Numerous other changes may be made which will readily suggest themselves to those skilled in the art and which are encompassed in the spirit of the invention disclosed and as defined in the appended claims.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a skip write detector for a magnetic data storage system, it will be appreciated by those skilled in the art that the teachings of the present invention can be applied to other systems, like optical data storage systems, without departing from the scope and spirit of the present invention.

What is claimed is:

1. An apparatus for determining a fly height of a read/write head relative to a data storage media in a data storage device during a write operation, the read/write head having a write element, the apparatus comprising:
   a circuit detecting an instantaneous reflected signal from the write element during the write operation and comparing the instantaneous reflected signal to a baseline.

2. The apparatus of claim 1 wherein the circuit comprises an amplifier connected to a filter, the filter connected to a variable-gain-amplifier, the variable-gain-amplifier connected to a rectifier, the rectifier connected to a sample-and-hold circuit and connected to an adjustable filter, the sample-and-hold circuit connected to a comparator, and the adjustable filter connected to a comparator circuit.

3. The apparatus of claim 1 wherein the write element has a write element electrical lead connecting the write element to a controller, the controller operable to manage the write operation.

4. The apparatus of claim 1 wherein the circuit is inductively coupled to the write circuit.

5. The apparatus of claim 1 wherein a read element electrical lead is used to inductively couple the circuit to the write circuit.

6. The apparatus of claim 1 wherein a trace conductor is used to inductively couple the circuit to the write circuit.

7. A method of determining a fly height of a read/write head relative to a data storage media in a data storage device, the method comprising steps of:
   a) writing data to a first desired location on the data storage media; and,
   b) determining the fly height of the read/write head by monitoring a reflected signal from the read/write head.

8. The method of claim 7 further comprising step:
   c) determining whether the fly height is within a predetermined range of fly heights.

9. The method of claim 8 wherein determining step (c) comprises the step of:
   (c)(i) determining whether a difference between an instantaneous reflected signal and a baseline reflected signal is within a predetermined range.

10. The method of claim 8 wherein the predetermined range of fly heights of determining step (c) corresponds to the amount of permissible deviation from a nominal fly height.

11. The method of claim 7 wherein the data storage device has a controller, a write circuit, and the read/write head has a write element connected to the controller by a write element electrical lead, and a data storage media with a data zone, and determining step (b) comprises steps of:
   (b)(i) detecting a first reflected signal with a circuit;
   (b)(ii) sampling and holding the first rectified signal for a specified time constant to obtain a sampled and held signal;
   (b)(iii) detecting a second reflected signal with the circuit; and
   (b)(iv) comparing the sampled and held signal to the second reflected signal.

12. The method of claim 11 wherein detecting steps (b)(i) and (b)(iii) each includes passing the detected signal through a low-pass filter circuit.

13. The method of claim 11 wherein detecting steps (b)(i) and (b)(iii) each includes passing the detected signal through an adjustable filter.

14. The method of claim 11 wherein sampling and holding step (b)(ii) is implemented using a sample-and-hold circuit.

15. The method of claim 11 wherein the data storage media comprises two or more data zones and wherein sampling and holding step (b)(ii) further comprises choosing a time constant relative to the data zone to which data is being written.

16. The method of claim 7 further comprising steps of:
   (c) suspending writing step (a) if the fly height is not within a predetermined range of fly heights; and,
   (d) if the fly height is not within the predetermined range of fly heights, then implementing a rewrite procedure.

17. The method of claim 16 wherein the rewrite procedure (d) comprises steps of:

(d)(i) resetting a retry counter;

(d)(ii) rewriting data to the first desired location on the data storage media;

(d)(iii) determining the fly height while the data is rewritten by monitoring the reflected signal from the write element;

(d)(iv) determining whether the fly height is within the predetermined range of fly heights;

(d)(v) suspending the rewrite procedure if the fly height is not within the predetermined range of fly heights;

(d)(vi) incrementing the retry counter if the fly height is not within the predetermined range of fly heights;

(d)(vii) comparing the retry counter to a retry limit;

(d)(viii) rewriting data at the first desired location on the media if the retry counter has not reached the retry limit;

(d)(ix) repeating writing step (a) through implementing step (d) at a second desired location on the storage media if the retry counter reaches the retry limit.

18. An apparatus for detecting a write skip error occurring during a data storage device write operation comprising:

a circuit for determining a fly height of a write element relative to a data storage media by detecting a signal reflected by the write element indicating the instantaneous VSWR of the write element; and means for instituting a rewrite procedure if the fly height of the write element relative to the data storage media is not within a predetermined acceptable range as indicated by the signal reflected by the write element.

* * * * *